Patented Dec. 9, 1952

2,621,132

UNITED STATES PATENT OFFICE 2,621,132

CEMENT COMPOSITION

Reyerus Nicolaas Jan Saal, Amsterdam, Netherlands, assignor to Shell Development Company, San Francisco, Calif., a corporation of Delaware No Drawing. Application March 22, 1949, Serial No. 82,926. In the Netherlands June 21, 1948

3 Claims. (Cl. 106—95)

The present invention relates to cement composition having a retarded setting action.

It is sometimes desirable to retard the setting of a cement slurry. This is particularly true in the field of well drilling where it is common to cement oil or gas wells at depths greater than 10,000 feet. The greater the depth at which a cementation is to be carried out, the longer the time required to pump the cement to its proper location within the borehole. Also, high temperatures are often encountered in deep boreholes which generally accelerate the setting action of cements.

Thus, when borehole cementations are carried out at a depth between 10,000 and 14,000 feet, borehole temperatures in the range of 150–170° C. may be expected and the time required for a cement slurry to be pumped to that depth may be in the vicinity of 120 minutes, the time being also dependent upon the quantity of cement to be pumped and the capacity of the pumps being used. It is, therefore, obvious that borehole cementations of deep wells must be carried out with a cement composition possessing slow-setting characteristics whereby the cement may be pumped for extended periods of time at elevated temperatures without setting.

For purposes of comparison made hereinbelow it may be mentioned at this time that the temperature of a well at a 6,000 foot depth is generally about 90° C. and also, that at a temperature of 150° C. cement sets from 2 to 4 times faster than at a temperature of 90° C.

While cements having a retarded setting action are particularly useful in cementing deep boreholes, it may sometimes be advantageous to use a slow setting cement slurry in shallow wells or at shallower depths in the deep boreholes, for instance, when a cementation has to be carried out slowly or requires more than the normal time owing to technical conditions or operational difficulties.

When reference is made hereinbelow to the seting of the cement slurry, it is to be understood that this refers to the moment at which the so-called "initial setting" commences. When cement and water are mixed, the setting or stiffening of the mixture will at first be very gradual and later rapidly accelerate at a certain moment which is called "the moment of initial setting." This moment practically corresponds to the limit of pumpability, that is, that moment after which the cement cannot be pumped.

It is an object of this invention to provide a method for cementing wells by means of a composition having a retarded setting action, said setting action being readily controllable by the addition of varying small quantities of a retarding agent to said cement.

It is also an object of this invention to effect the cementing of wells by means of a cement slurry composition incorporating a retarding agent, said composition exhibiting no tendency to foam and being substantially stable at all times, particularly under tropical conditions.

These and other objects of this invention will be understood from the following detailed description of the invention.

A product suitable for use in the process of the present invention comprises a finely ground mixture containing a suitable binding agent, preferably a Portland cement, which is a mixture of compounds of silica, alumina and lime, together with a very small proportion of an oxidized paraffin wax or a fraction thereof. Other inert material, such as sand, gravel, etc., may be added to the mixture. According to this invention, it is proposed to add a small quantity of an oxidized paraffin wax to a known hydraulic binding agent, such as cement, whereby a water slurry of said binding agent and said wax exhibits a retarded setting action. Preferably, the amount of wax used may vary from 0.3 to 1½ per cent of the quantity of dry binding agent used.

While the addition of small quantities of oxidized paraffin wax has proved satisfactory in retarding the setting action of cement, excellent results have also been obtained by the addition of small amounts of that fraction of the oxidized paraffin wax which does not dissolve in gasoline having a boiling range of 60 to 80° C. The major portion of this fraction consists of oxy-acids or wax acids, that is, the acidic compounds formed during the oxidation of paraffin waxes, said oxyacids possessing relatively long carbon chains, generally having from 12 to 18 carbon atoms per molecule. The oxidized paraffin wax may be prepared in any suitable manner as by blowing air through melted paraffin wax at elevated temperatures. The oxy-acids used were prepared by treating oxidized paraffin wax with gasoline having a boiling range of 60 to 80° C. The portion of the wax that did not dissolve in the gasoline was added to cement in small quantities.

The wax or fraction to be added may be conveniently dissolved in the liquid used for mixing the binding agent, since the wax or fraction to be added according to the invention readily dissolves in an aqueous solution with a hydroxyl ion concentration greater than approximately $10^{-4}$ mols per liter, for example, in aqueous solutions of sodium, potassium or ammonium hydroxides.

Preferably, a concentrated alkali solution of the substance is prepared first, after which this solution is added to the water for mixing the cement. A hydraulic cement prepared in the above-described manner exhibits slow-setting properties which are extremely desirable when such a cement is used in the cementing of well boreholes.

EXAMPLE

To blast furnace cements Nos. 1, 2 and 3 and to Portland cement No. 4, various quantities of several types of oxidized paraffin wax were added (calculated on the quantity of cement), in which process the wax was dissolved in the liquid used for mixing the cement. The mixing liquid consisted of a solution of caustic soda in water. The setting time in minutes up to the moment of initial setting was measured for various percentages of oxidized paraffin wax. The proportion of the caustic soda, calculated on the quantity of cement, was also varied. The temperature at which the experiments were carried out was 90° C., while the weight ratio of mixing liquid to cement was 0.4. The results are listed in Table I wherein the setting times in minutes up to the moment of initial setting are given.

TABLE I

*Setting time of cement slurry with oxidized paraffin wax*

| Type of cement | Type of oxidized paraffin wax | Percent of oxidized paraffin wax | Percent NaOH | | | | | |
|---|---|---|---|---|---|---|---|---|
| | | | 0 | 0.2 | 0.4 | 0.6 | 0.8 | 1.0 |
| | | | Initial setting time (in minutes) | | | | | |
| Blast furnace cement No. 1 | A | 0 | 60 | 55 | 55 | 55 | 55 | 50 |
| | | 0.7 | | | 145 | 135 | 130 | 125 |
| | | 0.9 | | | 345 | 325 | 275 | 280 |
| | B | 0.7 | | | 125 | 125 | 125 | 125 |
| | | 0.9 | | | 305 | 315 | 340 | 365 |
| | C | 0.7 | | | 165 | 150 | 145 | 140 |
| | | 0.9 | | | 385 | 365 | 360 | 355 |
| Blast furnace cement No. 2 | A | 0 | 60 | 60 | 55 | 55 | 55 | 55 |
| | | 0.5 | | | 160 | 150 | 145 | 125 |
| | | 0.6 | | 340 | 360 | 380 | >450 | >450 |
| | | 0.7 | | | >460 | >460 | >460 | >460 |
| | B | 0.5 | | | 155 | 150 | 140 | 130 |
| | | 0.6 | | 190 | 200 | 200 | 235 | 250 |
| | | 0.7 | | | >445 | >445 | >400 | >400 |
| | C | 0.5 | | | 135 | 135 | 135 | 135 |
| | | 0.6 | | | | | | |
| | | 0.7 | | | >430 | >430 | >430 | >430 |
| Blast furnace cement No. 3 | A | 0 | 45 | 45 | 40 | 35 | 30 | 25 |
| | | 0.7 | | | | | | |
| | | 0.8 | | >440 | >420 | >420 | | |
| | | 0.9 | | >420 | >420 | >420 | >420 | >420 |
| | B | 0.7 | | 165 | 165 | 155 | 205 | 245 |
| | | 0.9 | | | >400 | >400 | >400 | >400 |
| | C | 0.7 | | | 265 | 285 | 315 | 300 |
| | | 0.9 | | | >360 | >360 | >360 | >360 |
| Portland cement No. 4 | A | 0 | 80 | 95 | 70 | 50 | 40 | 30 |
| | | 0.6 | | | 150 | 150 | 125 | 120 |
| | | 0.7 | | 240 | 250 | 275 | 345 | 435 |
| | | 0.8 | | | >400 | >400 | >400 | >400 |
| | B | 0.6 | | | 145 | 135 | 145 | 145 |
| | | 0.7 | | 250 | 265 | 320 | >400 | >400 |
| | | 0.8 | | | >400 | >400 | >400 | >400 |
| | C | 0.6 | | | 185 | 195 | 235 | 245 |
| | | 0.7 | | | | | | |
| | | 0.8 | | | | | | |

TABLE Ia

*Analysis of samples of oxidized paraffins*

| Sample | Acid Value | Saponification Value | Oxy Acids in Percent (Insoluble in 60/80° C. Gasoline Fraction) |
|---|---|---|---|
| A | 119.4 | 220.6 | 48.4 |
| B | 87.2 | 224.7 | 38.0 |
| C | 92.9 | 217.7 | 29.8 |
| D | 105.3 | 216.5 | 39.4 |

TABLE II

| Fraction from oxidized paraffin wax | Percent of oxy-acids | Initial setting in minutes |
|---|---|---|
| A | 0.4 | 95 |
| | 0.6 | 190 |
| | 0.7 | 360 |
| | 0.8 | >360 |
| B | 0.4 | 95 |
| | 0.6 | 180 |
| | 0.7 | 320 |
| | 0.8 | >445 |
| C | 0.4 | 90 |
| | 0.6 | 180 |
| | 0.7 | 300 |
| | 0.8 | >410 |
| D | 0.4 | 90 |
| | 0.6 | 170 |
| | 0.7 | 270 |
| | 0.8 | >425 |

The results show that the retarding period is of the desired order of magnitude, i. e., 120 minutes or more, and gradually increases in proportion to the quantity of oxidized paraffin wax or oxy-acids added, the effect being adequate with all types of cement. It was also found that cement slurried incorporating oxy-acids had lower viscosities and thus could be more readily pumped than those slurried to which oxidized paraffin wax had been added.

I claim as my invention:

1. A fluid cement slurry having a retarded setting action for use in well cementing operations at temperatures over atmospheric, said cement comprising a hydraulic cement having admixed therewith from 0.2 to 2.5% of a gasoline insoluble high molecular weight oxidized paraffin wax.

2. A fluid cement slurry having a retarded setting action for use in well cementing operations at temperatures over atmospheric, said cement comprising a hydraulic cement having admixed therewith approximately 0.4% of high molecular weight oxidized paraffin wax, said wax being dissolved in 0.2% aqueous solution of caustic soda.

3. A fluid cement slurry having a retarded setting action for use in well cementing operations at temperatures over atmospheric, said cement comprising a blast furnace cement having admixed therewith approximately 0.4% of high molecular weight oxidized paraffin wax, said wax being dissolved in 0.2% aqueous solution of caustic soda.

REYERUS NICOLAAS JAN SAAL.

REFERENCES CITED

The following references are of record in the file of this patent:

UNITED STATES PATENTS

| Number | Name | Date |
|---|---|---|
| 1,285,636 | Davidson | Nov. 26, 1918 |
| 2,003,656 | Starke | June 4, 1935 |
| 2,188,767 | Cannon et al. | Jan. 30, 1940 |
| 2,290,956 | Gruenwald et al. | July 28, 1942 |
| 2,305,113 | Scripture | Dec. 15, 1942 |
| 2,337,671 | Linford et al. | Dec. 28, 1943 |
| 2,427,683 | Ludwig | Sept. 23, 1947 |
| 2,512,067 | Linford | June 20, 1950 |